(12) United States Patent
Peters et al.

(10) Patent No.: US 11,136,268 B2
(45) Date of Patent: Oct. 5, 2021

(54) CERAMIC-METALLIC COMPOSITES WITH IMPROVED PROPERTIES AND THEIR METHODS OF MANUFACTURE

(71) Applicant: FIRELINE, INC., Youngstown, OH (US)

(72) Inventors: Klaus-Markus Peters, Boardman, OH (US); Brian Paul Hetzel, Boardman, OH (US); Walter Ray Whitman, Salem, OH (US)

(73) Assignee: Fireline, Inc.

( * ) Notice: Subject to any disclaimer, the term of this patent is extended or adjusted under 35 U.S.C. 154(b) by 0 days.

(21) Appl. No.: 16/791,109

(22) Filed: Feb. 14, 2020

(65) Prior Publication Data

US 2021/0253481 A1    Aug. 19, 2021

(51) Int. Cl.
| | |
|---|---|
| B22D 19/08 | (2006.01) |
| C04B 35/65 | (2006.01) |
| C04B 35/10 | (2006.01) |
| C22C 1/02 | (2006.01) |
| C22C 1/10 | (2006.01) |
| C04B 35/657 | (2006.01) |

(52) U.S. Cl.
CPC .............. *C04B 35/10* (2013.01); *B22D 19/08* (2013.01); *C04B 35/652* (2013.01); *C04B 35/657* (2013.01); *C22C 1/026* (2013.01); *C22C 1/1036* (2013.01); *C04B 2235/3217* (2013.01); *C04B 2235/3418* (2013.01); *C04B 2235/3826* (2013.01); *C04B 2235/402* (2013.01); *C04B 2235/405* (2013.01); *C04B 2235/428* (2013.01); *C22C 2001/1057* (2013.01)

(58) Field of Classification Search
CPC .... B22D 19/00; B22D 19/0054; B22D 19/08; B22D 19/085; B22D 23/04; C04B 35/14; C04B 35/565
See application file for complete search history.

(56) References Cited

U.S. PATENT DOCUMENTS

| | | |
|---|---|---|
| 2,702,750 A | 2/1955 | George |
| 4,828,008 A | 5/1989 | White et al. |
| 5,214,011 A | 5/1993 | Breslin |
| 5,728,638 A | 3/1998 | Strange et al. |
| 7,267,882 B2 | 9/2007 | Breslin et al. |

OTHER PUBLICATIONS

Daehn et al., "Co-continuous composite materials for friction and braking applications," JOM, 58, pp. 87-91, 2006 (Year: 2006).*

(Continued)

*Primary Examiner* — Kevin E Yoon
(74) *Attorney, Agent, or Firm* — H. Jay Spiegel

(57) ABSTRACT

Ceramic-metallic composites are disclosed along with the processes for their manufacture. The present invention improves high temperature strength of $Al_2O_3$—Al composites by displacing aluminum in the finished product with other substances that enhance the high temperature strength. Each process commences with a preform initially composed of at least 5% by weight silicon dioxide, and the finished product includes $Al_2O_3$, aluminum and another substance.

13 Claims, 15 Drawing Sheets

(56) References Cited

OTHER PUBLICATIONS

La Vecchia et al, "Co-continuous Al/Al2O3 composite produced by liquid displacement reaction: Relationship between microstructure and mechanical behavior," Journal of Material Science, 38, pp. 3567-3577, 2007 (Year: 2007).*

Myers, "Structure-Property Relationship of Binder Jetted Fused Silica Preforms to Manufacture Ceramic-Metallic Interpenetrating Phase Composites," Ph.D. Thesis, Youngstown State University, 2016 (Year: 2016).*

Cortes et al., "The dynamic properties of sandwich structures based on metal-ceramic foams," 2014, Youngstown State University (Year: 2014).*

M.C. Breslin, Processing, microstructure, and properties of co-continuous alumina-aluminum composites, Materials Science & Engineering, A195, pp. 113-119, 1995.

TCON Data Sheet (2006).

J. R. Davis, ASM Specialty Handbook: Aluminum and Aluminum Alloys, 1993.

M.W. Chase, Jr., NIST-JANAF Thermochemical Tables, Fourth Edition, Parts 1 and 2, 1998.

Liu, W. and Koster, U., Criteria for Formation of Interpenetrating Oxide/Metal-Composites by Immersing Sacrificial Oxide Preforms in Molten Metals, Scripta Materialia, 1996.

Milward Alloys, Inc., Master Alloys Selection Chart.

Dr. J.G. Hemrick, Nano-Scale Interpenetrating Phase Composites (IPC's) for Industrial and Vehicle Applications, Apr. 2010.

Marjan Moro, Nano-Characterization of Ceramic-Metallic Interpenetrating Phase Composite Material using Electron Crystallography, May 2012, Youngstown State University.

Anthony M. Yurcho, Microstructural Investigation of Al/Al—Fe alloy—Al2O3 Interpenetrating Phase Composites Produced by Reactive Metal Penetration, May 2011.

* cited by examiner

| Typical Composition (weight %) | TC1 | TC2 | TQ1 | TQ2 |
|---|---|---|---|---|
| SiC | 50 | 55 | 0 | 0 |
| $Al_2O_3$ | 37 | 33 | 75 | 75 |
| Al | 0 | 0 | 25 | 25 |
| Al alloy (80% Al – 20% Si) | 13 | 12 | 0 | 0 |

|  | Aluminum weight % | Silicon weight % |
|---|---|---|
| Melt A | 100 | - |
| Melt B | 75 | 25 |
| Melt C | 50 | 50 |

|  |  |  |  | Modulus of Rupture (MPa) | | |
|---|---|---|---|---|---|---|
| Experiment | Material | SiC? | Melt | 20°C | 700°C | % Change (hot vs. RT) |
| 1 | TQ1X-A | no | 0% Si (Melt A) | 108 | 11 | -90% |
|   | TQ1X-B | no | 25% Si (Melt B) | 109 | 31 | -72% |
|   |        |    | % Change: | 1% | 182% |  |
| 2 | TQ1X-A | no | 0% Si (Melt A) | 108 | 11 | -90% |
|   | TQ1X-C | no | 50% Si (Melt C) | 39 | 19 | -51% |
|   |        |    | % Change: | -64% | 73% |  |
| 3 | TC2X-B | yes | 25% Si (Melt B) | 36 | 29 | -19% |
|   | TC2X-C | yes | 50% Si (Melt C) | 61 | 53 | -13% |
|   |        |     | % Change: | 69% | 83% |  |

|        | Aluminum weight % | Silicon weight % | Iron weight % |
|--------|-------------------|------------------|---------------|
| Melt D | 85                | -                | 15            |
| Melt E | 66.5              | 26               | 7.5           |

| Experiment | Material | Melt | Modulus of Rupture (MPa) | | % Change (hot vs. RT) |
|---|---|---|---|---|---|
| | | | 20°C | 700°C | |
| 4 | TC1X-B | 25% Si | 84 | 24 | -71% |
| | TC1X-E | 7.5% Fe - 25% Si | 59 | 31 | -47% |
| | | % Change: | -30% | 29% | |
| 5 | TC2X-B | 25% Si | 36 | 29 | -19% |
| | TC2X-E | 7.5% Fe - 25% Si | 59 | 39 | -34% |
| | | % Change: | 64% | 34% | |

CERAMIC-METALLIC COMPOSITES WITH IMPROVED PROPERTIES AND THEIR METHODS OF MANUFACTURE

BACKGROUND OF THE INVENTION

The present invention consists of embodiments of ceramic-metallic composites with improved properties and their methods of manufacture. Ceramic-metallic composites, particularly, those including aluminum and aluminum compounds as constituent ingredients, have numerous applications. These include use in brake components including brake rotors, degassing rotors, riser tubes, dies and molds, heater immersion tubes, thermocouple protection tubes, ladles, stirring devices, bearings, nozzles, bushings, valve components, clutches, engine components, turbine components, electrical conductors, heat sinks, thermal diffusers, metal working dies, ballistic armor, cutting tools, components of sporting goods such as golf club heads and ice skating blades, impellers, and others.

The melting point of aluminum is 660.3° C. (1,221° F.). Applicants have found that as a ceramic-metallic composite material containing aluminum has its temperature elevated, even to as low a temperature as 200° C., the strength of the material inherently diminishes, as much as over half the material strength at room temperature. The less aluminum in the ceramic composite, the less weakening occurs. As such, an important object of the present invention is to reduce the percentage of aluminum in the final ceramic composite to correspondingly reduce the weakening at elevated temperatures. As described in greater detail hereinafter, this object is achieved in three separate embodiments by creating ceramic-metallic composites in which the percentage of aluminum is significantly reduced.

The embodiments of the present invention are improvements over the inventions described in U.S. Pat. Nos. 5,214,011; 5,728,638; and 7,267,882 cited below. A preferred embodiment from those three prior art patents involves the following two major process steps:

1. A preform shape containing a sacrificial oxide ceramic, typically silicon dioxide ($SiO_2$), is conventionally fabricated. This preform shape may be totally comprised of that sacrificial oxide or also include inert ceramic additives, typically silicon carbide (SiC).

2. The preform shape is preheated to an operating temperature generally between about 1000 to 1250° C. and then fully immersed into a molten aluminum (Al) bath held at that same temperature range. The aluminum bath may be pure or it may contain trace impurities, inert alloying elements, or (when SiC is present in the preform) 20 to 30 weight % silicon (Si) to totally suppress any reaction between the SiC and Al. While the preform is immersed the sacrificial oxide reacts with the aluminum via a displacement reaction. The following reaction takes place when silicon dioxide is utilized: $4Al+3SiO_2=2Al_2O_3+3Si$. The shape is held in the molten aluminum bath long enough for the displacement reaction to go to completion and all of the sacrificial oxide converted over to aluminum oxide ($Al_2O_3$). Upon completion of the reaction the shape is removed from molten aluminum bath. If no silicon was initially in the bath then the silicon yielded from this reaction will be significantly diluted, yielding a composite of $Al_2O_3$—Al. If the preform contains silicon carbide, then a $Al_2O_3$—Al—Si—SiC composite results. The weight of aluminum and silicon in the final composite will depend upon the amount of porosity in the original preform.

Composites produced from the prior art have a variety of useful properties, especially near room temperature. However, at temperatures above 200° C. the strength of these composites drops considerably because of the free aluminum phase; aluminum alloys typically lose over half of their strength or more as the metal is heated from room temperature to over 200° C.

The following prior art is known to Applicants:

U.S. Pat. No. 2,702,750 to George discloses methods of fabricating aluminum oxide ($Al_2O_3$)-aluminum (Al) ceramic-metallic composites produced by displacement reactions in a molten metal Al bath at preferred temperatures of 700 to 900° C. The present invention differs from the teachings of George in that the inventive process is carried out at temperatures significantly higher than that of George (typically 1000 to 1200° C.). A composite produced via this patent will experience a significant reduction in mechanical properties (e.g., strength) as the material is heated to 200° C. and above because the aluminum will soften with the rising temperature, while the present invention results in composites with improved high temperature properties.

U.S. Pat. No. 5,214,011 to Breslin discloses methods of fabricating aluminum oxide ($Al_2O_3$)-aluminum (Al) ceramic-metallic composites produced by displacement reactions in a molten metal bath at preferred temperatures of at least 300° C. above the melting point of aluminum (Al) (660° C.). The processes disclosed in this patent are carried out at 960° C. and higher. A composite produced via this patent will experience a significant reduction in mechanical properties (e.g., strength) as the material is heated to 200° C. and above because the aluminum will soften with the rising temperature, while the present invention results in composites with improved high temperature properties.

U.S. Pat. No. 5,728,638 to Strange discloses improvements on the inventions disclosed in Breslin '011 by incorporating inert metal additives that result in property improvements. However, as with Breslin '011, a composite produced via this patent will experience a significant reduction in mechanical properties (e.g., strength) as the material is heated to 200° C. and above, while the present invention results in composites with improved high temperature properties.

U.S. Pat. No. 7,267,882 to Breslin discloses improvements on the invention disclosed in Breslin '011 by incorporating inert ceramic additives such as silicon carbide that result in property improvements. However, as with Breslin '011, a composite produced via this patent will experience a significant reduction in mechanical properties (e.g., strength) as the material is heated to 200° C. and above, while the present invention results in composites with improved high temperature properties.

Breslin '011, Strange '638, and Breslin '882 all discuss how the molten metal bath may contain other substances than aluminum and silicon, such as, other metals, dopants, alloying agents, or contaminants, either intentionally or unintentionally, which are all techniques that are well documented in the prior art on how improve the properties of aluminum. While Breslin '011 and Strange '638 are focused on $Al_2O_3$—Al composites and Breslin '882 is focused on $Al_2O_3$—Al—SiC composites, none of them recognize that the free aluminum in these composites will lose strength at temperatures above 200° C., regardless of how that aluminum is alloyed using prior art techniques, nor that this is a significant limiting factor in how the composites may be utilized in high temperature applications.

Breslin '882 discloses that the composite material must contain at least 50 volume percent silicon carbide of a specific particle size range (5-5000 micrometers) in order to optimize the amount of contact between these SiC particles and subsequently improve the final composite properties. Specifically, Breslin states that this will achieve greater improvement to strength, thermal and electrical conductivity, thermal shock resistance, hardness, and wear resistance as opposed to composites that contain less than 50 volume percent SiC, but presents no data to substantiate these claims.

Furthermore, with the inclusion of SiC in the composite, Breslin '882 discusses the need to have a minimum of amount of silicon in the molten metal bath in order to protect SiC from being attacked by the aluminum and subsequently forming aluminum carbide, which is an undesirable compound. This phenomenon is well known and also discussed in U.S. Pat. No. 4,828,008 (White). According to Breslin that minimum amount is 18 weight % Si, which would make the reaction of aluminum with the silicon carbide no longer thermodynamically favorable, and goes on to say the preferred amount is between about 20 and about 30 weight % Si.

Breslin further claims that the process can be carried out with Si levels as high at 95 weight % in the molten metal bath but then makes a contradictory statement that too much silicon may preclude the reaction of aluminum with silica because of insufficient aluminum in the molten metal to sustain the displacement reaction. Breslin '882 does not disclose or know that the free aluminum can be a limiting factor for strength of the final composite, especially at elevated temperatures above 200° C.

In contrast, the present invention demonstrates that there are several benefits to reducing the free aluminum through the addition of silicon or intermetallics: 1) the hot strength above 200° C. is improved in both $Al_2O_3$—Al and $Al_2O_3$—Al—SiC composites; 2) in some cases the room temperature strength may be improved; and 3) Applicants have found that increasing the amount of silicon will modify the resulting composite microstructure and make it more homogenous, which may be of benefit in optimizing other properties besides strength. In all three cases, the addition of SiC is not required for these benefits or not limited to requiring 50 volume % SiC.

Processing, Microstructure and Properties of Co-Continuous Alumina-Aluminum Composites, Materials Science & Engineering, A195, pp. 113-119, 1995 by Breslin, M. C., Ringnalda, J., Xu, L., Fuller, M., Seeger, J., Daehn, G. S., Otani, T. and Fraser, H. L. discloses data relied upon to support Applicants' assertions regarding the improvements of the present invention.

TCON® Data Sheet (2006). This reference documents the properties of ceramic grades produced utilizing the technology covered under Breslin '011, Strange and Breslin '882, and is relied upon to support the assertions of the improvements resulting from practicing the present invention.

U.S. Pat. No. 4,828,008 to White et al. discloses methods of fabricating aluminum oxide ($Al_2O_3$)-aluminum (Al) ceramic-metallic composites via completely different methodologies than those disclosed in George, Breslin '011, Strange and Breslin '882. A composite produced via this patent will experience a significant reduction in mechanical properties (e.g., strength) as the material is heated to 200° C. and above because the aluminum will soften with the rising temperature, while the present invention results in composites with improved high temperature properties.

ASM Specialty Handbook: Aluminum and Aluminum Alloys, Edited by J. R. Davis, 1993. This reference book documents the properties of aluminum and aluminum alloys, including the drop in strength as these metals are heated to 200° C. and above.

NIST-JANAF Thermochemical Tables, Fourth Edition, Parts 1 and 2, Edited by M. W. Chase, Jr., 1998. These two reference books contain thermodynamic data used to support the details of the present invention.

Liu, W. and Köster, U., Criteria for Formation of Interpenetrating Oxide/Metal-Composites by Immersing Sacrificial Oxide Preforms in Molten Metals, Scripta Materialia, Vol. 35, No. 1, pp. 35-40, 1996. This reference paper examines displacement reactions that are favorable for producing ceramic-metallic composites, including aluminum oxide ($Al_2O_3$)-aluminum (Al) composites that utilized a variety of starting raw materials. The data in this reference supports the present invention.

SUMMARY OF THE INVENTION

The present invention consists of embodiments of ceramic-metallic composites with improved properties and their methods of manufacture. Ceramic-metallic composites containing aluminum or aluminum alloys are materials that have a variety of useful properties, especially near room temperature. However, at temperatures above 200° C., the strength of these composites drop off considerably because of the aluminum phase; aluminum alloys typically lose over half of their strength as the metal is heated from room temperature to over 200° C., even though the melting point of aluminum is 660° C.

In order to address this problem, the present invention contemplates three unique methods of controlling the ceramic microstructures and improving the high temperature properties of ceramic-metallic composites, specifically aluminum oxide ($Al_2O_3$)-aluminum (Al) composites produced by displacement reactions in a molten metal bath.

A first method is accomplished by adding significant amounts of silicon (Si) in the molten Al metal bath, resulting in unique $Al_2O_3$—Al—Si composites.

A second method is accomplished by creating intermetallic compounds in the final composite material; specific elements are added into the molten Al metal bath and these elements in turn form intermetallic compounds as the primary displacement reaction is carried out. This method results in unique $Al_2O_3$—Al-intermetallic composites.

A third method is accomplished by creating intermetallic compounds in the final composite material via a different approach: secondary reactions are carried out in parallel with the primary displacement reaction, and these secondary reactions produce elements that in turn form intermetallic compounds. This method also results in unique $Al_2O_3$—Al-intermetallic composites.

These new methods are unobvious over existing technology reflected by the prior art discussed above, particularly the Breslin and Strange patents, that Applicants currently use to manufacture composites sold under the TCON® trademark. Applicants also use the term "transformation process" to describe their manufacturing methods of carrying out displacement reactions in a molten metal bath.

Displacement reactions between a metal and a sacrificial oxide will result in composites consisting of co-continuous ceramic-metal phases, and these materials have unique properties. Applicants' preferred method is to use a preform shape containing silicon dioxide ($SiO_2$) and to carry out these displacement reactions by fully immersing a preform into a bath of the molten metal; this method of carrying out displacement reactions is known as a "transformation" process. In order to avoid starving the reaction, it is best for the bath to contain more molten metal than the required minimum. Also, the preform shape is held in the bath until all of the sacrificial oxide has been reacted.

In one version of this process, the following reaction is utilized to produce aluminum oxide ceramic-aluminum metal ($Al_2O_3$—Al) based composites:

$$(4+x)Al + 3SiO_2 = 2Al_2O_3 + xAl + 3[Si]_{Al}$$

Note that the silicon (Si) by-product dissolves into the molten aluminum (Al); most of this flows into the Al bath, and some amount remains in the final composite material. This results in a material with a composition of 74 weight % $Al_2O_3$, 26 weight % Al, and a trace of the Si reaction by-product. The structure of material typically produced with this process is seen in FIGS. 1, 2, and 3.

In another version of this transformation process, silicon carbide (SiC) particles can be added to these $Al_2O_3$—Al based composites in order to affect the final properties, e.g., increasing the thermal shock resistance of the material. Under the right processing conditions, the SiC additive is inert and doesn't participate in the displacement reaction. More specifically, in order to prevent the SiC from reacting with the Al, the molten aluminum bath contains excess Si in order to suppress the reaction $4Al + 3SiC = Al_4C_3 + 3Si$. Subsequently, the reaction may be written as:

$$(4+x)Al + 3SiO_2 + y[Si]_{Al} + zSiC = 2Al_2O_3 + xAl + (3+y)[Si]_{Al} + zSiC$$

The resulting material retains the basic $Al_2O_3$—Al structure, similar to that seen in FIGS. 2 and 3, which bonds the SiC additives together. These types of composites are being commercially produced by Applicants' Assignee Fireline, Inc. and sold under the TCON® trademark; the compositions of these materials are listed in FIG. 4, and typical photomicrographs in FIG. 5.

This transformation process is carried out at temperatures typically above 900° C. in order to form alpha aluminum oxide ($\alpha\ Al_2O_3$) from the displacement reaction. Special furnaces and equipment are used to hold the molten aluminum bath at the desired temperature, plus to fully immerse the preforms and then later pull out the final TCON® composite shapes from the bath. As stated before, these composites have unique properties but their usefulness is limited because the strength significantly drops as the temperature is elevated. FIG. 6 shows how the strength drops 73% (from 750 to 200 MPa) as the $Al_2O_3$—Al composite is heated from room temperature to 800° C., and FIG. 7 shows how the strength of two TCON® grades drop 56 to 72% as the temperature is raised from room temperature to 700° C.

In order to increase the mechanical properties of these co-continuous metal oxide-metal composites at elevated temperatures, Applicants have developed three methods of reducing the amount of free aluminum in the material. The first two methods involve the alloying of the molten aluminum bath in order to affect the final material produced via the transformation process, while the third method implements parallel reactions that take place during the primary transformation process.

1. The first method significantly increases the amount of silicon in the molten metal. This approach was chosen because silicon has a higher melting point than aluminum and will precipitate out as discrete crystals. The goal of this method is to displace the amount of aluminum in the composite with silicon crystals and enhance high temperature properties.

2. The second method utilizes chosen elements because they readily form high temperature intermetallics (compounds formed between two or more metals and metalloids) with aluminum alone, as well as with aluminum and silicon together. These intermetallics typically have melting points that are higher than aluminum. Again, the goal of this method is to displace the amount of aluminum in the composite with intermetallic compounds and enhance high temperature properties.

3. The third method accomplishes the same end result as the second method, but in a different manner. It involves adding secondary types of sacrificial oxides to the preform, in addition to the primary sacrificial oxide used to create the composite materials. These secondary displacement reactions free up elements, which in turn readily form intermetallic compounds with either aluminum alone or with aluminum and silicon together.

Numerous potential industrial uses for these improved ceramic-metallic composites have been outlined in the prior art patents disclosed and discussed above. Applicants' Assignee Fireline, Inc.'s current product and market development focus is on automotive brake rotors, and the inventive composites offer significant performance improvements in that application.

As such, it is a first object of the present invention to provide ceramic-metallic composites with improved properties and methods of making them.

It is a further object of the present invention to provide such composites recognizing that the strength of aluminum in such a composite diminishes when exposed to temperatures exceeding 200° C.

It is a further object of the present invention to direct the improvements to ceramic-metallic composites specific to those incorporating aluminum oxide and aluminum produced by displacement reactions in a molten metal bath.

It is a still further object of the present invention to create such composites, in one embodiment, by adding significant amounts of silicon in the molten aluminum metal bath resulting in unique $Al_2O_3$—Al—Si composites.

It is a still further object of the present invention to create such composites, in a further embodiment thereof, resulting in unique $Al_2O_3$—Al-intermetallic composites.

It is a yet further object of the present invention to create intermetallic compounds in the final composite material through secondary reactions carried out in parallel with a primary displacement reaction, thereby producing formation of unique $Al_2O_3$—Al-intermetallic composites.

It is a still further object of the present invention to not only provide such composites but to also disclose and claim their methods of manufacture.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
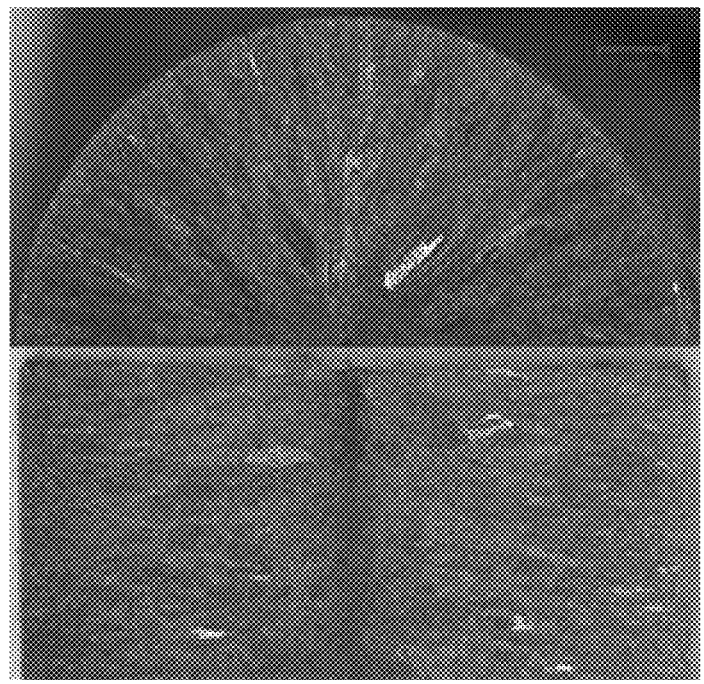
FIG. 1 shows two stereo optical photomicrographs at 10× magnification of $Al_2O_3$—Al composite prior art samples produced from Melt A. The top half of FIG. 1 is the lateral cross-section and the bottom half of FIG. 1 is the longitudinal cross-section of a 10 mm diameter rod.

The following three embodiments for this invention make significant changes to the composition of the molten aluminum (Al) bath in the prior art embodiment, resulting in unique composites with lower amounts of free aluminum and subsequently improved properties over those resulting from the prior art embodiment.

Embodiment #1—Elevated Silicon Contents

The first embodiment of this invention utilizes a molten aluminum-silicon (Al—Si) bath containing significant amounts of silicon (2 to 95 weight %) to produce $Al_2O_3$—Al—Si and $Al_2O_3$—Al—Si—SiC composites. These resulting composites have lower amounts of free aluminum and greater high temperature strengths than the composites produced via the preferred embodiment from the prior art patents.

Aluminum-silicon alloy melts that contain greater than 2 weight % Si will precipitate out Si crystals upon cooling and solidification. As the silicon content is increased in Al—Si alloys the amount of free aluminum will decrease in the solidified alloy, having been displaced by Si crystals. As a result, the composites produced from this embodiment can achieve greater high temperature strengths with this reduction of free aluminum in the final material.

It was also surprising to learn that adding large amounts of Si to the molten Al bath has a very significant impact on the resulting microstructure of the aluminum oxide in the final composite material, going from a heterogeneous microstructure to a much more uniformly homogeneous structure. This processing technique allows the material microstructure to be tailored to fit the application requirements, whereby a more homogeneous structure may be desirable for certain applications and a less homogeneous structure appropriate for others.

The preferred embodiment in U.S. Pat. No. 7,267,882 utilizes an operating temperature between about 1000 to 1250° C. and a molten Al—Si bath containing 20 to 30 weight % silicon (Si) to totally suppress any reaction between silicon carbide (SiC) in the preform and the aluminum in the bath. A process temperature range of 1000 to 1250° C. in the present invention's embodiment is also acceptable for molten aluminum-silicon alloys containing Si up to approximately 60 weight percent, and the resulting $Al_2O_3$—Al—Si—SiC composite will have a higher temperature strength than the composite produced utilizing the prior art.

However, because silicon has a higher melting point than aluminum (1414° C. for Si versus 660° C. for Al), the melting temperature of Al—Si alloys increase as the Si content increases. Subsequently 1250° C. would be too low of a temperature to carry this embodiment at concentrations greater than 60 weight percent silicon. Therefore, the preferred processing temperature would generally be between 1250 to 1650° C. for silicon concentrations from 60 to 95 weight %.

In summary, this first embodiment is an improvement over the prior art embodiment as a result of utilizing: a) a molten Al—Si bath containing 30 to 60 weight % silicon at a process temperature of about 900 to 1250° C.; or b) a molten Al—Si bath containing about 60 to 95 weight % silicon at a process temperature of about 1250 to 1650° C.

Examples of Embodiment #1—Elevated Silicon Contents

Example 1

Figures 7, 8:
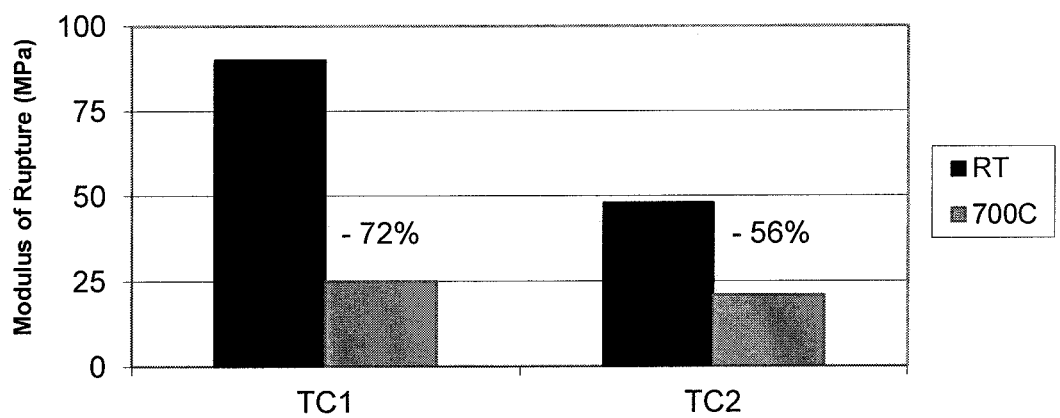
FIG. 7 shows 3-point bend modulus of rupture of two standard prior art TCON grades versus temperature with % strength loss noted for each.
FIG. 8 shows a chart of three Melts of experimental molten Al—Si alloys.

Three preform rod shapes containing 100% silicon dioxide ($SiO_2$) were conventionally fabricated. Three different molten metal aluminum-silicon (Al—Si) alloy baths were prepared (FIG. 8) and heated to a temperature of 1200° C., with Melt A containing 0% Si, Melt B containing 25 weight % Si, and Melt C containing 50 weight % Si.

Figure 2:
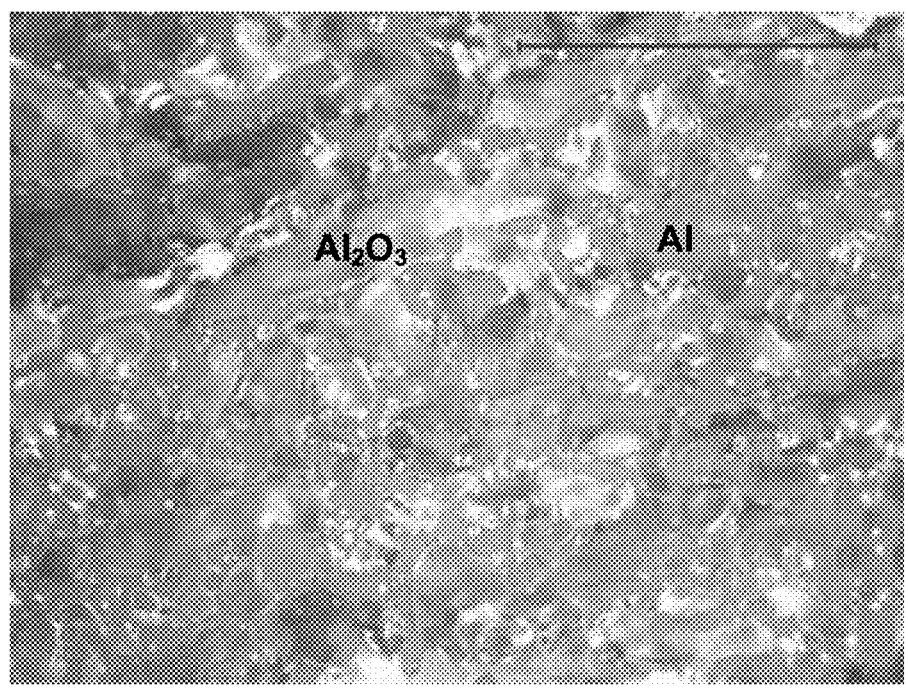
FIG. 2 shows a polarized optical photomicrograph at 1,000× magnification of $Al_2O_3$—Al composite prior art sample produced from Melt A. The red bar in the upper right hand corner of the photomicrograph shows the distance 50 μm.
Figures 3, 4:
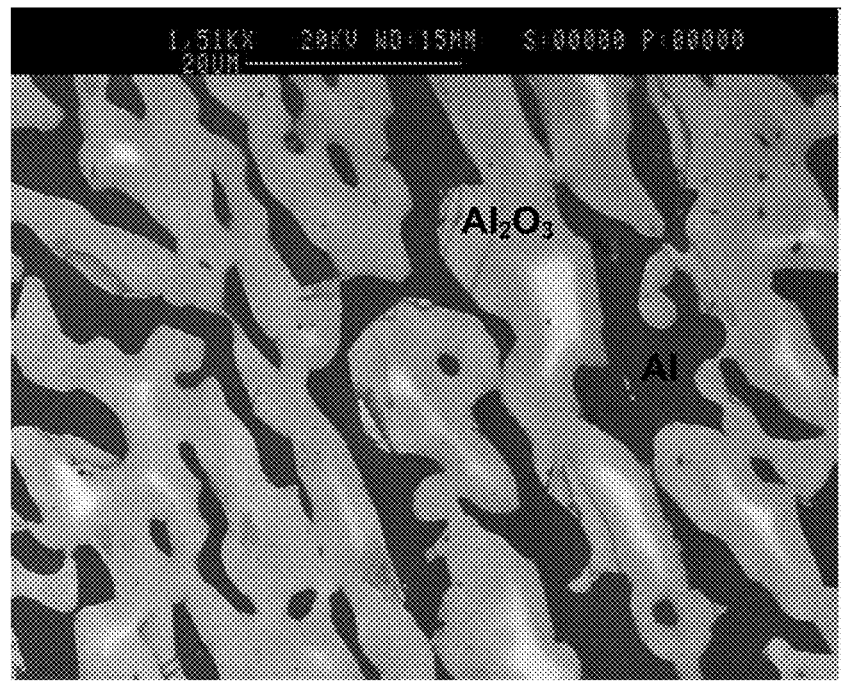
FIG. 3 shows a scanning electron microscope (SEM) photomicrograph at 1,500× magnification of an $Al_2O_3$—Al composite prior art sample produced from Melt A.
FIG. 4 shows a chart detailing composite grades for compositions of FIGS. 1-3 and FIGS. 5-7.
Figure 5:
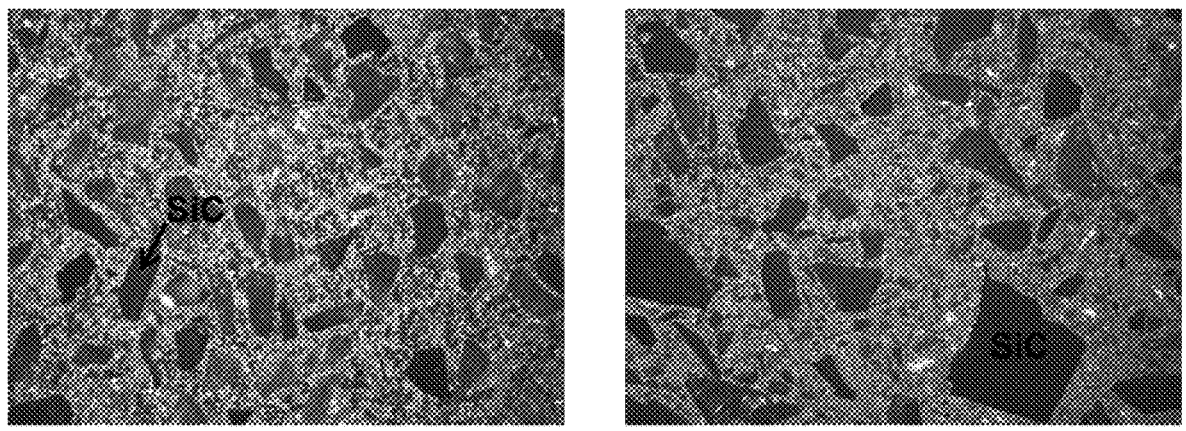
FIG. 5 shows two stereo optical photomicrographs at 50× magnification of an $Al_2O_3$—Al—SiC composite prior art sample. The left hand photomicrograph is of grade TC1 and the right hand photomicrograph is of grade TC2.
Figure 6:
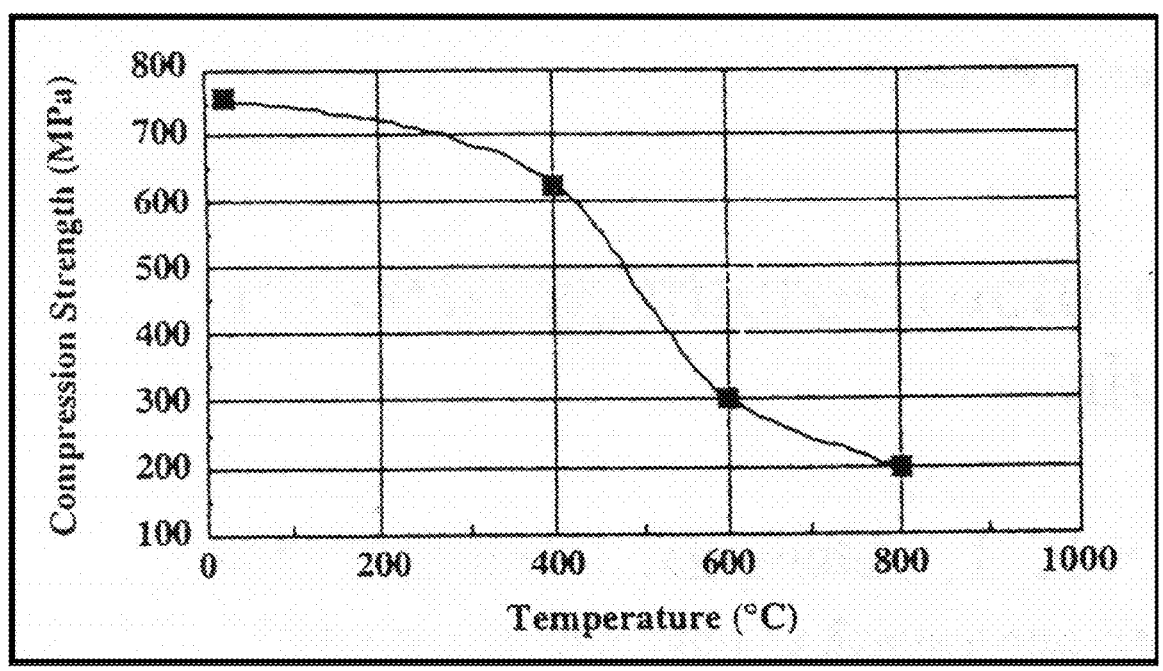
FIG. 6 shows a graph of compression strength versus temperature of a prior art $Al_2O_3$—Al composite.
Figure 10:
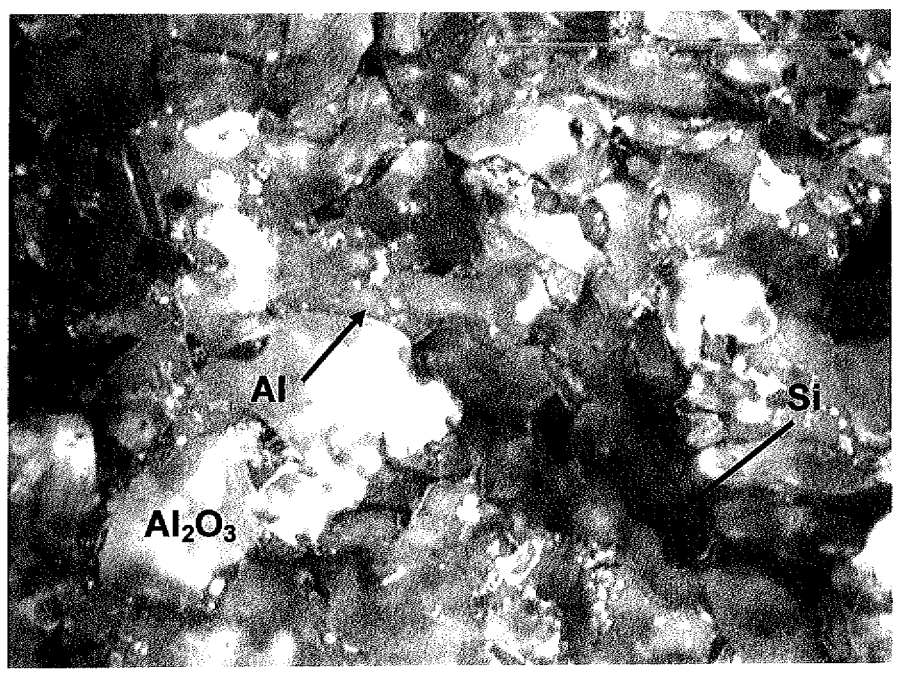
FIG. 10 shows a polarized optical photomicrograph at 1,000× magnification of $Al_2O_3$—Al composite sample produced from Melt B from FIG. 8. The red bar in the upper right hand corner of the photomicrograph shows the distance 50 μm.
Figure 11:
FIG. 11 shows an SEM photomicrograph at 1,500× magnification of $Al_2O_3$—Al composite sample produced from Melt B in FIG. 8.

One of the preform rods was preheated to 1200° C.; it was fully immersed in one of the three molten metal baths and then extracted upon completion of the displacement reaction, with the process repeated with the other two rods and melts, resulting in either an $Al_2O_3$—Al or $Al_2O_3$—Al—Si composite. The microstructures of those composites were examined; the composite produced from Melt A (0% Si) is seen in FIGS. 1, 2, and 3, the composite produced from Melt B (25% Si) is shown in FIGS. 9, 10, and 11, and the composite from Melt C (50% Si) is seen in FIGS. 12, 13, 14, and 15.

The $Al_2O_3$—Al composite material produced from Melt A (0% Si) resulted in a very radially oriented microstructure and no visible silicon. The $Al_2O_3$—Al—Si composite from Melt B (25% Si) resulted in a somewhat homogenous microstructure, and the composite from Melt C (50% Si) resulted in a somewhat homogenous microstructure, both with visible clusters of silicon.

Figure 9:
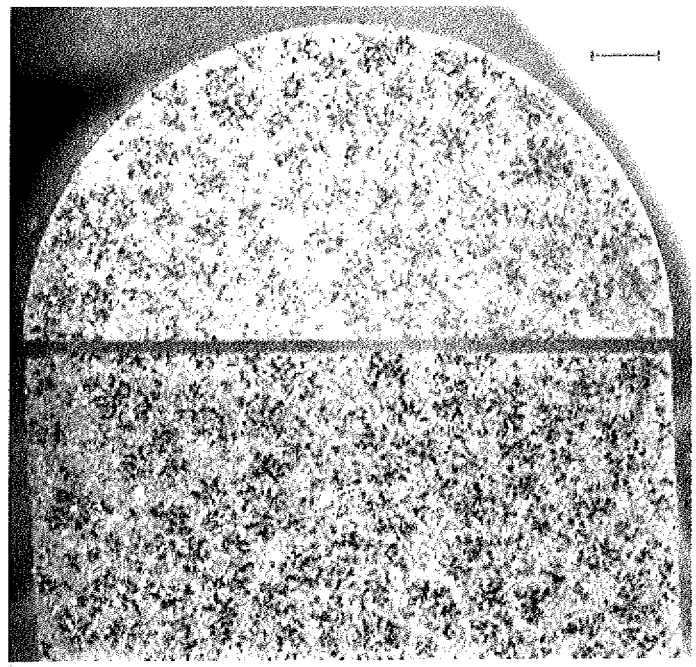
FIG. 9 shows two stereo optical photomicrographs at 10× magnification of $Al_2O_3$—Al composite sample produced from Melt B from FIG. 8. The top half of FIG. 9 is the lateral cross-section and the bottom half of FIG. 9 is the longitudinal cross-section of a 10 mm diameter rod.
Figure 12:
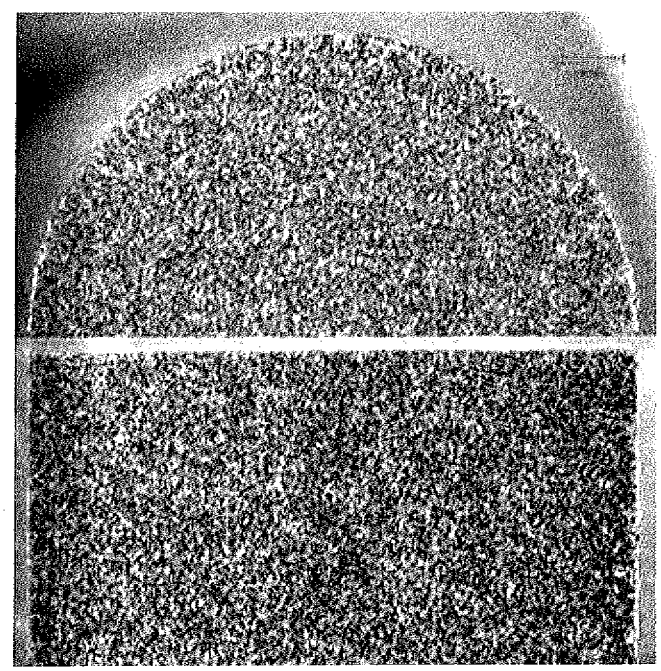
FIG. 12 shows stereo optical photomicrographs at 10× magnification of $Al_2O_3$—Al composite sample produced from Melt C from FIG. 8. The top half of FIG. 12 is the lateral cross-section and the bottom half of FIG. 12 is the longitudinal cross-section of a 10 mm diameter rod.
Figure 13:
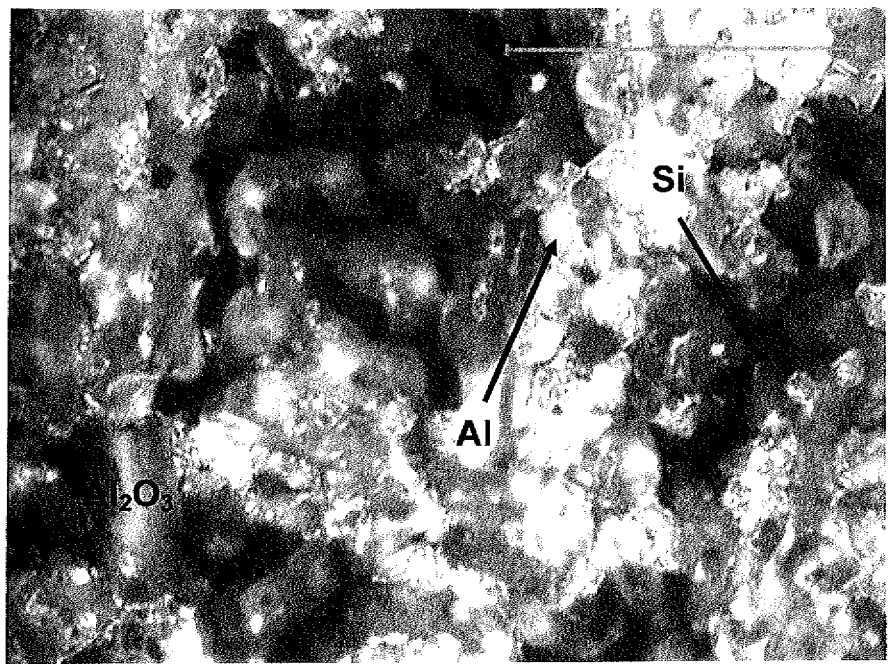
FIG. 13 shows a polarized optical photomicrograph at 1,000× magnification of $Al_2O_3$—Al composite sample produced from Melt C from FIG. 8. The red bar in the upper right hand corner of the photomicrograph shows the distance 50 μm.
Figure 14:
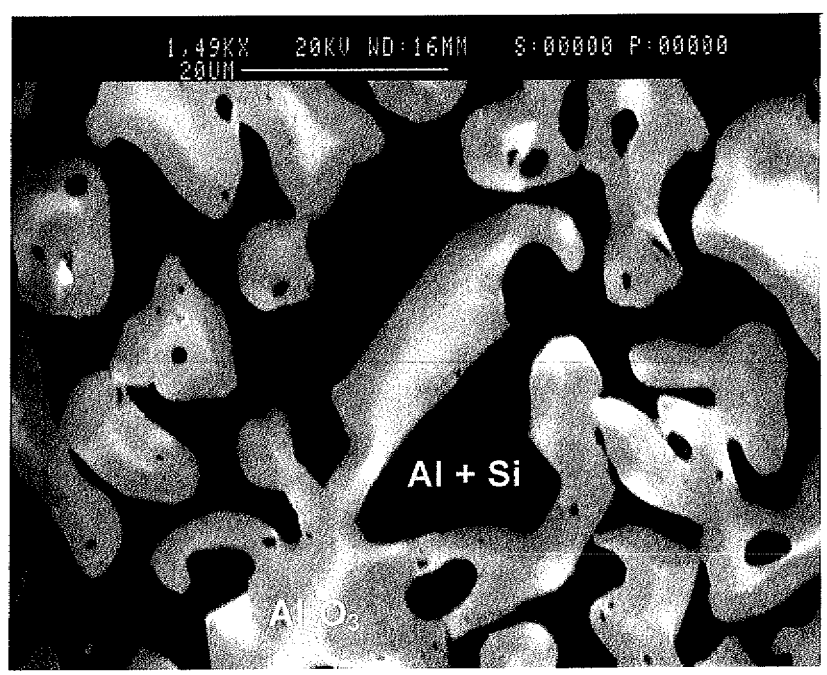
FIG. 14 shows an SEM photomicrograph at 1,500× magnification of $Al_2O_3$—Al composite sample produced from Melt C.

The Si clusters are readily visible in both FIGS. 9 and 12, and appear to be proportional to the amount of silicon in the melt, i.e., the microstructure in FIG. 12 (50% Si) is much more homogeneous and has twice the amount of clusters than what is visible in FIG. 9 (25% Si). The contrast of the silicon crystals was not high enough to make them stand out against the aluminum metal in the scanning electron microscope (SEM) photomicrographs of FIGS. 2, 11, and 14. Using a different SEM with higher sensitivity, the composite produced from Melt B (25% Si) was re-analyzed, allowing the silicon crystals to be much more observable in FIG. 15.

It was surprising to learn that adding large amounts of —Si to the molten Al bath still allows the transformation reaction to go to completion yet has a very significant impact on the resulting microstructure of the material, going from a heterogeneous, radially oriented structure (at 0% Si) to a much more uniformly homogeneous structure. This processing technique allows the material microstructure to be tailored to fit the application requirements, whereby a more homogeneous structure may be desirable for certain applications and a more radially oriented structure appropriate for others.

Example 2

Three sets of preform test bar shapes were conventionally fabricated (TQ1X), containing 100% silicon dioxide ($SiO_2$). Three different molten metal aluminum-silicon (Al—Si) alloy baths were also prepared (FIG. 8) and heated to a temperature of 1200° C., with Melt A containing 0% Si, Melt B containing 25 weight % Si, and Melt C containing 50 weight % Si.

The three sets of the TQ1X preform test bars were preheated to 1200° C. and then one set was fully immersed in one of the three molten metal baths and then extracted upon completion of the displacement reaction, with the process repeated with the other sets of bars and melts. This resulted in either an $Al_2O_3$—Al or $Al_2O_3$—Al—Si composite.

Figures 15, 16:
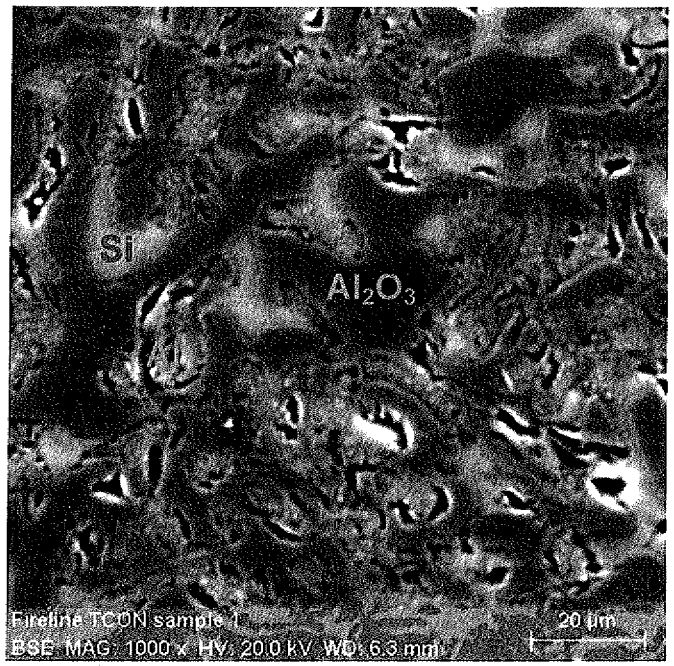
FIG. 15 shows an SEM photomicrograph at 1,000× magnification of $Al_2O_3$—Al composite sample produced from Melt B.
FIG. 16 shows a chart of the 3-point bend modulus of rupture of experimental $Al_2O_3$—Al—Si composites with and without SiC produced from Melts A, B, and C identified in FIG. 8.
Figure 17:
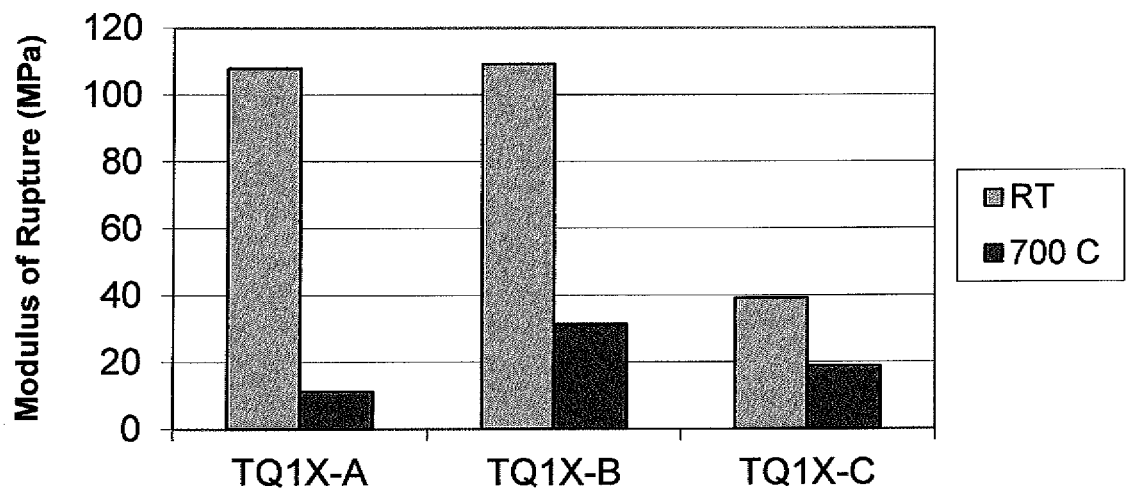
FIG. 17 shows the 3-point bend modulus of rupture of experimental materials TQ1X ($Al_2O_3$—Al—Si composites) produced from Melts A, B, and C identified in FIG. 8.

The modulus of rupture was measured on all three sets of test bars at both room temperature (20° C.) and at high temperature (700° C.), and the results are displayed in FIGS. 16 and 17. It was found that the silicon content in the molten metal alloy baths have a significant effect on the strength of the composite materials. In comparing TQ1X-A to TQ1X-B, it was found that increasing the silicon from 0 to 25 weight % had practically no effect on the room temperature strength, but substantially increased the strength at 700° C. (by 182%). In comparing TQ1X-A to TQ1X-C, it was found that increasing the silicon from 0 to 50 weight % did reduce the room temperature strength, but substantially increased the strength at 700° C. (by 73%).

Example 3

Two sets of preform test bar shapes were conventionally fabricated (TC2X) containing 36 weight % silicon dioxide ($SiO_2$) and 64 weight % silicon carbide (SiC). Two different molten metal aluminum-silicon (Al—Si) alloy baths were also prepared (FIG. 8) and heated to a temperature of 1200° C., with Melt B containing 25 weight % Si and Melt C containing 50 weight % Si.

Two sets of the TC2X preform test bars were preheated to 1200° C., then one set was fully immersed in Melt B (25% Si) and the other set fully immersed in Melt C (50% Si). Both sets were then extracted upon completion of the displacement reaction, resulting in $Al_2O_3$—SiC—Al—Si composites.

Figure 18:
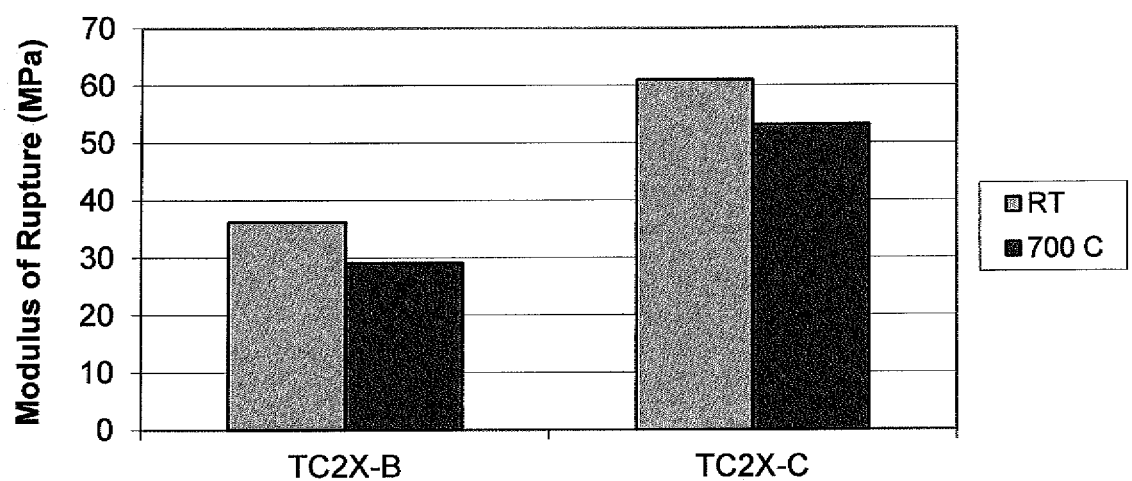
FIG. 18 shows the 3-point bend modulus of rupture of experimental materials TC2X (SiC—$Al_2O_3$—Al—Si composites) produced from Melts B and C identified in FIG. 8.

The modulus of rupture was measured on the two sets of test bars at both room temperature (20° C.) and at high temperature (700° C.), and the results are displayed in FIGS. 16 and 18. Again, it was found that the silicon content in the molten metal alloy baths have a significant effect on the strength of the composite materials. Comparing the data from TC2X-B to TC2X-C, it was found that increasing the silicon from 25 to 50 weight % substantially increase the room temperature strength (by 69%) and the high temperature strength at 700° C. (by 83%).

Embodiment #2—Intermetallics Via the Melt

The second embodiment of this invention utilizes intermetallics to produce one of the following composites: $Al_2O_3$—Al-intermetallics, $Al_2O_3$—Al—Si-intermetallics, or $Al_2O_3$—Al—Si—SiC-intermetallics, whereby the intermetallics are binary, complex, or a mixture of both. These resulting composites have lower amounts of free aluminum and greater high temperature strengths than the composites produced via the preferred embodiment from the prior art patents.

This embodiment involves the direct addition of elements into the aluminum melt in order to form preferred intermetallic compounds, which are compounds formed between two or more metals or metalloids (such as silicon, antimony, and tellurium). These elements can form binary intermetallic compounds when just one element is added into an aluminum melt, while complex intermetallic compounds can form when two or more elements are present in an aluminum melt.

In this embodiment preferred elements and intermetallic compounds are selected starting with two criteria: 1) the boiling point of the element is above 1250° C. (since the preferred processing temperature range is 900 to 1250° C.); and 2) the resulting binary intermetallic compound has a melting point higher than that for pure aluminum (660° C.) but no higher than 1250° C. A review of published aluminum phase diagrams found at least twenty three elements that form the binary intermetallics that meet these two criteria:

Antimony —AlSb
Barium —$Al_4Ba$, $Al_{13}Ba_7$, $A_5Ba_4$
Calcium —$Al_4Ca$, $Al_2Ca$
Cerium —$Al_{11}Ce_3$, $Al_3Ce$, AlCe
Chromium —$Al_7Cr$, $Al_{13}Cr_2$, $Al_{11}Cr_2$, $A_5Cr$, $A_4Cr$, $Al_9Cr_4$, $Al_8Cr_5$, $AlCr_2$
Cobalt —$Al_9Co_2$, $Al_{13}Co_4$, $Al_3Co$, $A_5Co_2$
Copper —$Al_4Cu_9$
Erbium —$Al_3Er$, AlEr, $Al_2Er_3$, $AlEr_2$
Gadolinium —$Al_3Gd$, AlGd, $Al_2Gd_3$, $AlGd_2$
Holmium —$Al_3Ho$, AlHo, $Al_2Ho_3$, $AlHo_2$
Iron —$FeAl_2$, $Fe_2Al_5$, $FeAl_3$
Manganese —$Al_6Mn$, $Al_4Mn$, $Al_{11}Mn_4$
Molybdenum —$Al_3Mo$, $Al_5Mo$, $Al_4Mo$
Neodymium —$Al_{11}Nd_3$, $Al_3Nd$, AlNd, $AlNd_2$, $AlNd_3$
Nickel —$Al_3Ni$, $Al_3Ni_2$, $Al_3Ni_5$
Platinum —$Al_{21}Pt_5$, $Al_{21}Pt_8$
Praseodymium —$Al_{11}Pr_3$, $Al_3Pb$, AlPr, $AlPr_2$
Strontium —$Al_4Sr$, $Al_2Sr$, $A_7Sr_8$
Tellurium —$Al_2Te_3$
Thorium —$ThAl_2$, ThAl, $ThA_3$, $Th_2Al_7$
Vanadium —$Al_{21}V2$, $Al_{45}V7$, $Al_{23}V_4$
Yttrium —$Al_3Y$, AlY, $Al_2Y3$, $AlY_2$
Zirconium —$Zr_3Al$, $Zr_2Al$, $Zr_3Al_2$, $Zr_4Al_3$ Also, numerous complex intermetallics (containing three or more elements) can be formed by combining aluminum with two or more metals or metalloids (such as silicon). Based on the preferred elements from above list and in addition to the binary intermetallic compounds, the following complex intermetallics can form when more than one of those elements is present:

$Cr_4Si_4Al_3$,
$Cu_2FeAl_7$,
$Cu_2Mn_3Al_{20}$,
$Cu_3NiAl_6$,
(Fe, Cr)$Al_3$, (Fe, Mn)$Al_3$
$FeSiAl_5$
(Fe, Cu)$Al_6$, (Fe, Mn)$Al_6$, (Fe, Mn, Cr)$Al_6$
(Fe, Mn, Cr)$Al_7$
$FeNiAl_9$
$Fe_2Si_2Al_9$,
$Fe_3SiAl_{12}$, $Mn_3SiA_{12}$, (Fe, Cr)$_3SiAl_2$, (Fe, Cu)$_3SiAl_{12}$, (Fe, Mn)$_3SiAl_2$,
(Fe, Mn, Cr)$_3SiAl_{12}$.
$Fe_3Si_2Al_{12}$,

In summary, this second embodiment is an improvement over the prior art embodiment as a result of utilizing a molten aluminum alloy bath, which may or may not contain silicon, containing one or more of the preferred compounds listed above in concentrations of approximately 1 to 95 weight %, at a process temperature of about 900 to 1250° C. The resulting composites contain intermetallic compounds that are binary, complex, or a mixture of both, thereby reducing the amount of free aluminum and increasing the high temperature strengths as compared with the prior art.

Examples of Embodiment #2—Intermetallics via the Melt

Example 4

A preform rod shape containing 100% silicon dioxide ($SiO_2$) was conventionally fabricated. A molten metal aluminum-iron (Al—Fe) alloy bath was prepared (Melt D in FIG. 19) and heated to a temperature of 1200° C. This Melt D contained 85 weight % aluminum and 15 weight % iron. The preform rod was preheated to 1200° C. and was fully immersed in the Melt D bath and then extracted upon completion of the displacement reaction. The result was a $Al_2O_3$—Al-intermetallic composite.

Figures 19, 20:
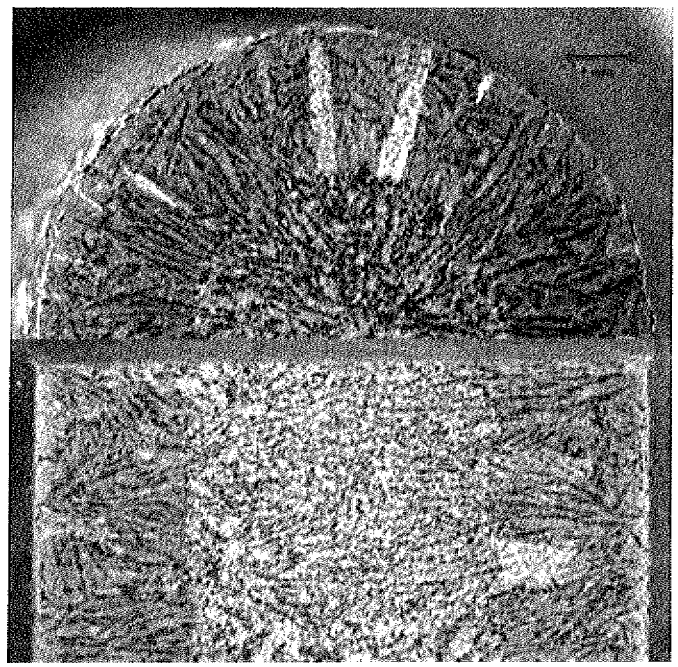
FIG. 19 shows a chart depicting properties of Melts D and E which comprise experimental molten Al—Fe and Al—Si—Fe alloys.
FIG. 20 shows stereo optical photomicrographs at 10× magnification of $Al_2O_3$—Al-intermetallic composite samples produced from Melt D as identified in FIG. 19. The top half of FIG. 20 is the lateral cross-section and the bottom half is the longitudinal cross-section of a 10 mm diameter rod.
Figure 21:
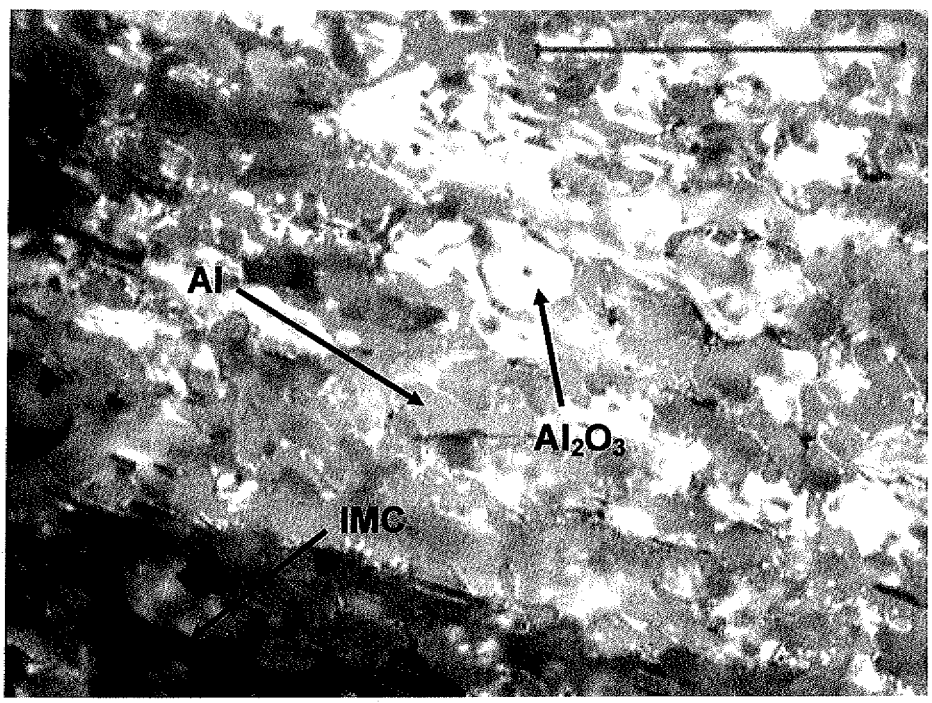
FIG. 21 shows a polarized optical photomicrograph at 1,000× magnification of an $Al_2O_3$—Al-intermetallic composite sample produced from Melt D identified in FIG. 19. The red bar in the upper right hand corner of the photomicrograph shows the distance 50 μm.
Figure 22:
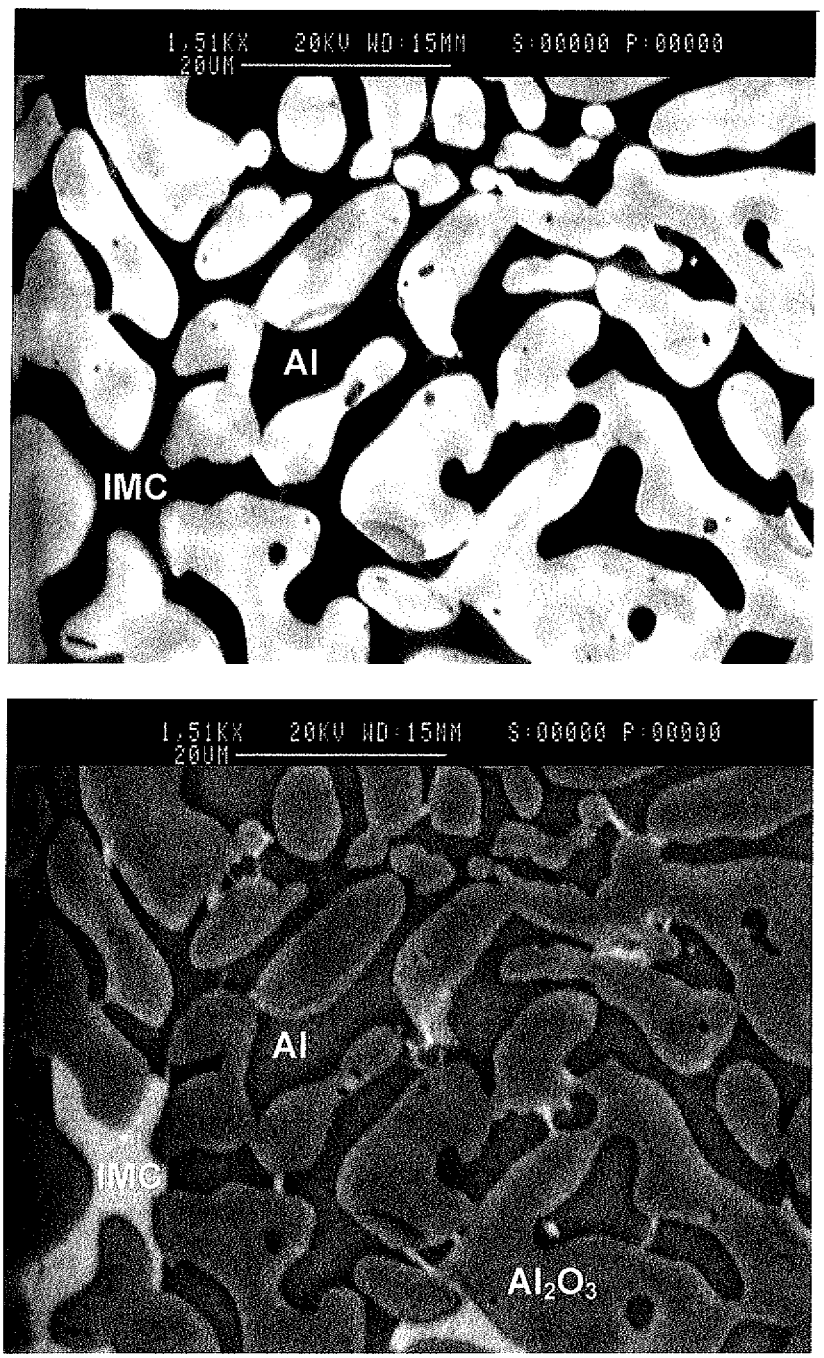
FIG. 22 shows two SEM photomicrographs at 1,500× magnification of $Al_2O_3$—Al-intermetallic composite sample produced from Melt D identified in FIG. 19. The top image is an SE signal image and the bottom image is a mixed SE/BSE image.

The microstructure of this composite was examined. Low magnification (10×) stereo optical photomicrographs, plus high magnification polarized optical photomicrographs (1,000×) and scanning electron microscope (SEM) photomicrographs (1,500×) were taken of this composite material and are shown in FIGS. 20, 21, and 22. As seen in FIG. 20, this $Al_2O_3$—Al-intermetallic composite material had a very radially oriented, inhomogeneous microstructure. Chemical analysis of the composite found that the intermetallic compound (IMC) visible in FIGS. 20 through 22 was $FeAl_3$, and that no silicon crystals or free iron was observed.

Example 5

A preform rod shape containing 100% silicon dioxide ($SiO_2$) was conventionally fabricated. A molten metal aluminum-silicon-iron (Al—Si—Fe) alloy bath was prepared (Melt E in FIG. 19) and heated to a temperature of 1200° C. This Melt E contained 66.5 weight % aluminum, 26 weight % silicon, and 7.5 weight % iron. The preform rod was preheated to 1200° C. and was fully immersed in the Melt E bath and then extracted upon completion of the displacement reaction. The result was a $Al_2O_3$—Al-intermetallic composite.

Figure 23:
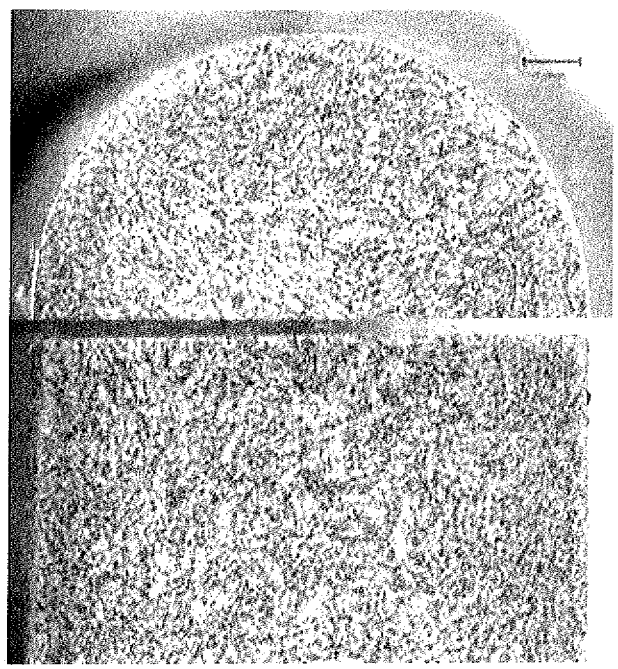
FIG. 23 shows a stereo optical photomicrograph at 1x magnification of $Al_2O_3$-A-intermetallic composite sample produced from Melt E identified in FIG. 19. The top half is the lateral cross-section and the bottom half is the longitudinal cross-section of a 10 mm diameter rod.
Figure 24:
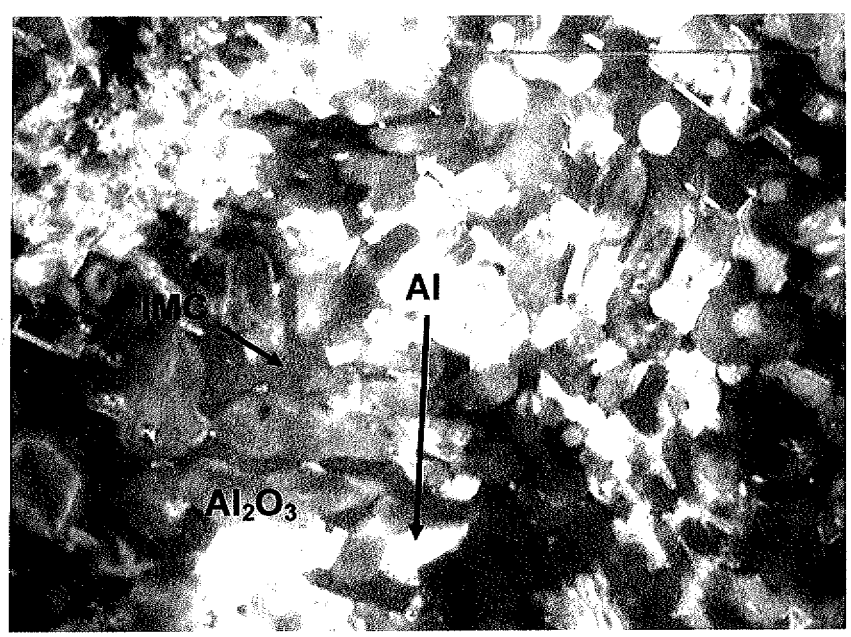
FIG. 24 shows a polarized optical photomicrograph at 1,000× magnification of $Al_2O_3$—Al-intermetallic composite sample produced from Melt E identified in FIG. 19. The red bar in the upper right hand corner of the photomicrograph shows the distance 50 μm.
Figure 25:
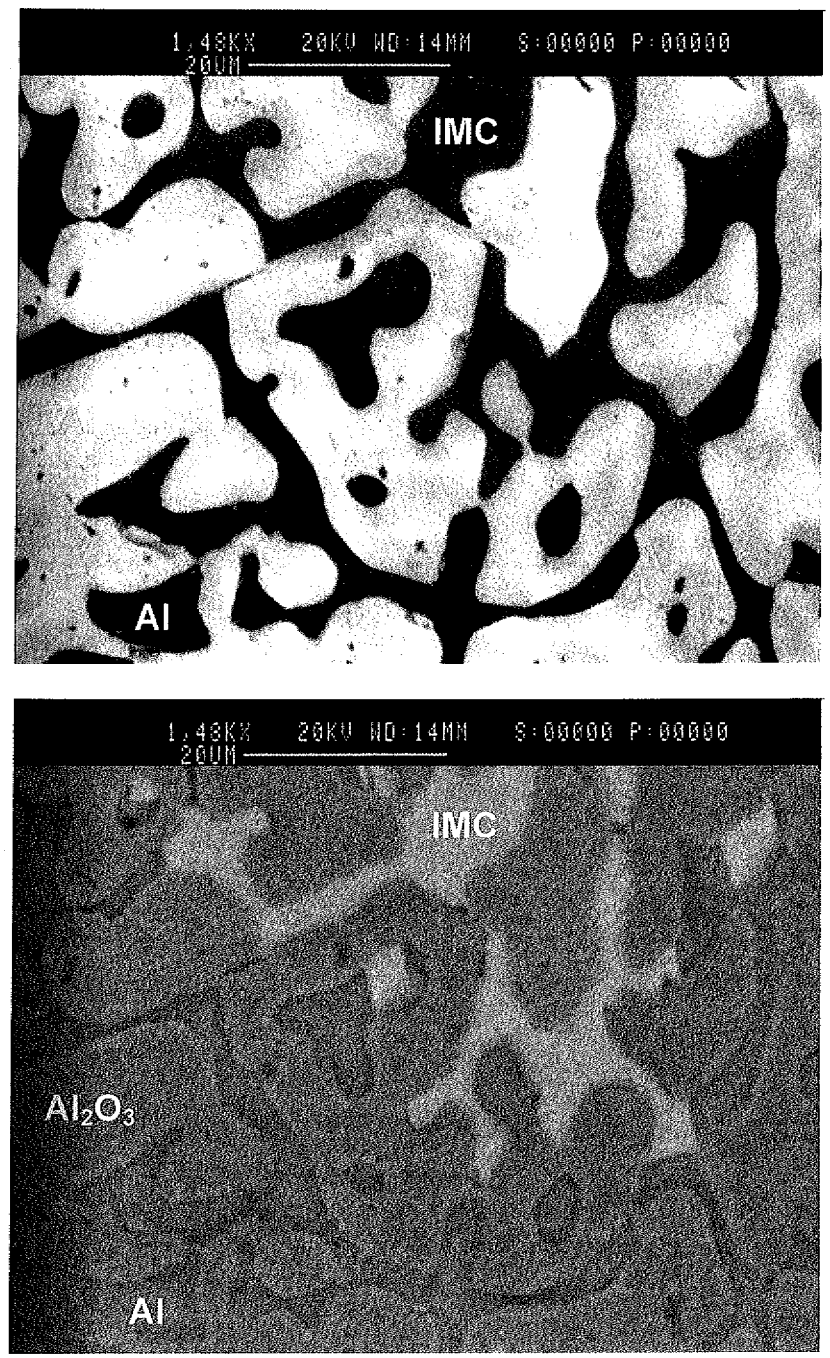
FIG. 25 shows SEM photomicrographs at 1,500× magnification of $Al_2O_3$—Al-intermetallic composite sample produced from Melt E identified in FIG. 19. The top photomicrograph is an SE signal image and the bottom photomicrograph is a mixed SE/BSE image.

The microstructure of this composite was examined. Low magnification (10×) stereo optical photomicrographs, plus high magnification polarized optical photomicrographs (1,000×) and scanning electron microscope (SEM) photomicrographs (1,500×) were taken of this composite material and are shown in FIGS. 23, 24, and 25. As seen in FIG. 23, this Al$_2$O$_3$—Al-intermetallic composite material had a homogeneous microstructure. Chemical analysis of the composite found that the intermetallic compound (IMC) visible in FIGS. 23 through 25 was FeSiAl$_5$, and that no silicon crystals or free iron was observed.

Example 6

Two sets of preform test bar shapes were conventionally fabricated (TC1X) and contained 40 weight % silicon dioxide (SiO$_2$) and 60 weight % silicon carbide (SiC). Two different molten metal aluminum alloy baths were also prepared and heated to a temperature of 1200° C.: Melt B (FIG. 8) contained 75 weight % aluminum and 25 weight % Si, and Melt E (FIG. 19) contained 66.5 weight % aluminum, 26 weight % silicon, and 7.5 weight % iron.

Two sets of the TC1X preform test bars were preheated to 1200° C., then one set was fully immersed in Melt B (25% Si) and the other set fully immersed in Melt E (26% Si, 7.5% Fe). Both sets were then extracted upon completion of the displacement reaction, resulting in Al$_2$O$_3$—SiC—Al-intermetallic composites.

Figures 26, 27:
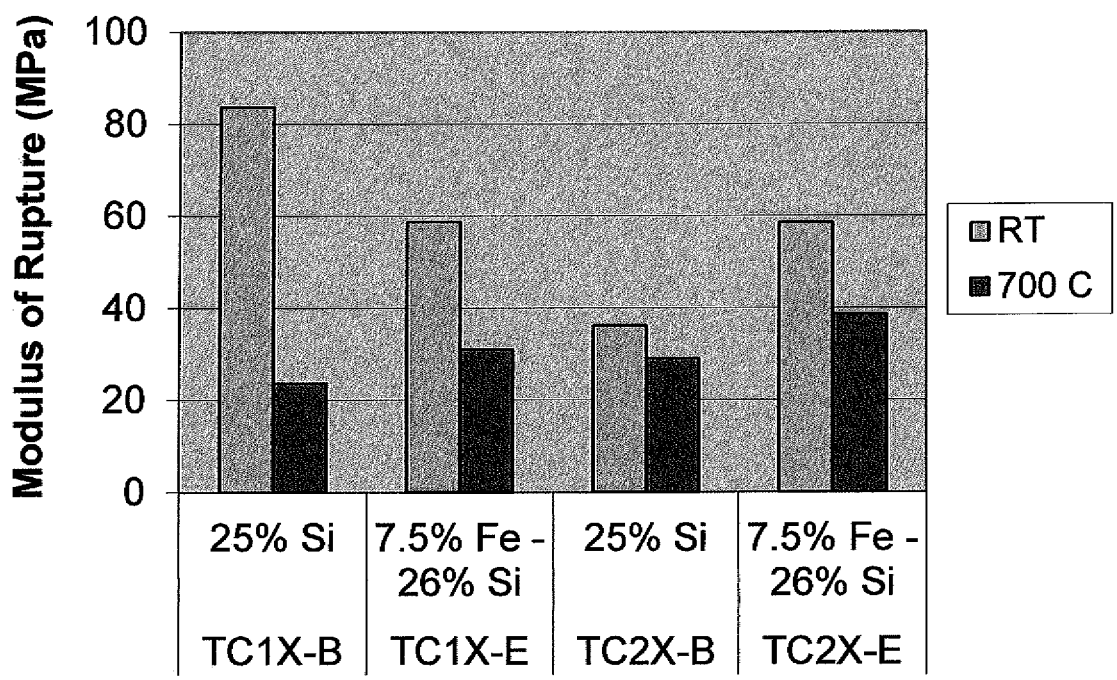
FIG. 26 shows a chart consisting of 3-point bend modulus of rupture information of experimental composites produced from Melt B identified in FIG. 8 and Melt E identified in FIG. 19 (SiC—$Al_2O_3$—Al—Si versus SiC—$Al_2O_3$—Al-intermetallic).
FIG. 27 shows a chart of 3-point bend modulus of rupture of experimental materials TC1X and TC2X produced from Melt B identified in FIG. 8 and Melt E identified in FIG. 19 (SiC—$Al_2O_3$—Al—Si versus SiC—$Al_2O_3$—Al-intermetallic composites).

The modulus of rupture was measured on the two sets of test bars at both room temperature (20° C.) and at high temperature (700° C.), and the results are displayed in FIGS. 26 and 27. Comparing the data from TC1X-B to TC1X-E it was found that formation of the intermetallic compound did reduce the room temperature strength, but substantially increased the strength at 700° C. (by 29%).

Example 7

Two sets of preform test bar shapes were conventionally fabricated (TC2X) and contained 36 weight % silicon dioxide (SiO2) and 64 weight % silicon carbide (SiC). Two different molten metal aluminum alloy baths were also prepared and heated to a temperature of 1200° C.: Melt B (FIG. 8) contained 75 weight % aluminum and 25 weight % Si, and Melt E (FIG. 19) contained 66.5 weight % aluminum, 26 weight % silicon, and 7.5 weight % iron.

The TC2X preform test bars were preheated to 1200° C., then one set was fully immersed in Melt B (25% Si) and the other set fully immersed in Melt E (26% Si, 7.5% Fe). Both sets were then extracted upon completion of the displacement reaction, resulting in Al$_2$O$_3$—SiC—Al-intermetallic composites.

The modulus of rupture was measured on the two sets of test bars at both room temperature (20° C.) and at high temperature (700° C.), and the results are displayed in FIGS. 26 and 27. Comparing the data from TC2X-B to TC2X-E it was found that formation of the intermetallic compound substantially improved the room temperature strength (by 64%) as well as the strength at 700° C. (by 34%).

Embodiment #3—Intermetallics Via Secondary Reactions

By following a different method than the second embodiment, the third embodiment of this invention also utilizes intermetallics to produce one of the following composites: Al$_2$O$_3$—Al-intermetallics, Al$_2$O$_3$—Al—Si-intermetallics, or Al$_2$O$_3$—Al—Si—SiC-intermetallics, whereby the intermetallics are binary, complex, or a mixture of both. These resulting composites also have lower amounts of free aluminum and greater high temperature strengths than the composites produced via the preferred embodiment from the prior art patents.

The third embodiment involves forming intermetallic compounds by indirectly adding the preferred elements into the aluminum melt. This is accomplished by incorporating oxides of those preferred elements into the preform shape and then processing it through the aluminum bath; the result displacement reactions of those oxides releases the preferred elements into the bath, subsequently forming intermetallics in the same way as described in the second embodiment.

Using the preferred compounds list from the second embodiment, a review of published literature cited supra found at least seven of those elements whose oxides can be reduced by molten aluminum via a displacement reaction: chromium, cobalt, copper, iron, manganese, molybdenum, and nickel. The following lists the displacement reactions that will take place when the preform shape is immersed in the molten metal bath at the preferred processing temperature range of 1000 to 1250° C.:

$$6Al+3Cr_2O_3=3Al_2O_3+6Cr$$

$$2Al+3CoO=Al_2O_3+3Co$$

$$2Al+3CuO=Al_2O_3+3Cu$$

$$8Al+3Fe_3O_4=4Al_2O_3+9Fe$$

$$2Al+3MnO=Al_2O_3+3Mn$$

$$4Al+3MoO_2=2Al_2O_3+3Mo$$

$$2Al+3NiO=Al_2O_3+3Ni$$

$$8Al+3NiCr_2O_4=4Al_2O_3+6Cr+3Ni$$

$$8Al+3FeCr_2O_4=4Al_2O_3+6Cr+3Fe$$

$$2Al+3NiAl_2O_4=4Al_2O_3+3Ni$$

$$2Al+3CoAl_2O_4=4Al_2O_3+3Co.$$

In summary, this third embodiment is an improvement over the prior art embodiment as a result of utilizing preform shapes that contain the preferred oxides listed above in concentrations of approximately 1 to 95 weight %, and then processing those preform shapes in a molten aluminum alloy bath which may or may not contain silicon at a process temperature of about 900 to 1250° C. The resulting composites contain intermetallic compounds that are binary, complex, or a mixture of both, thereby reducing the amount of free aluminum and increasing the high temperature strengths as compared with the prior art.

Examples of Embodiment #3—Intermetallics Via Secondary Reactions

Example 8

A preform test bar shape was conventionally fabricated containing 90 weight % silicon dioxide (SiO$_2$) and 10 weight % iron oxide (Fe$_3$O$_4$). A molten metal aluminum-iron (Al—Fe) alloy bath was prepared and heated to a temperature of 1200° C., which contained 85 weight % aluminum and 15 weight % iron (Melt D in FIG. 19). The preform test bar was preheated to 1200° C. and was fully immersed in the Melt D bath and then extracted upon completion of the displacement reaction. The result was a Al$_2$O$_3$—Al-intermetallic composite that contained the intermetallic compound $FeAl_3$ and no silicon crystals or free iron, similar to the microstructures for Example 4 (FIGS. 21 and 22).

Example 9

A preform test bar shape was conventionally fabricated containing 90 weight % silicon dioxide ($SiO_2$) and 10 weight % iron oxide ($Fe_3O_4$). A molten metal aluminum-silicon-iron (Al—Si—Fe) alloy bath was prepared and heated to a temperature of 1200° C., which contained 66.5 weight % aluminum, 26 weight % silicon, and 7.5 weight % iron (Melt E in FIG. 19).

The preform test bar was preheated to 1200° C. and was fully immersed in the Melt E bath and then extracted upon completion of the displacement reaction. The result was a $Al_2O_3$—Al-intermetallic composite that contained the intermetallic compound $FeSiAl_5$, and no silicon crystals or free iron, similar to the microstructures for Example 5 (FIGS. 24 and 25).

While the displacement reactions disclosed above are most efficiently carried out at bath temperature of at least 1200° C., they may be carried out, albeit more slowly, at temperatures as low as 900 and greater. In cases where the silicon content in the bath is 60% or greater, then the processing temperature would generally be between 1250 to 1650° C.

The preform may preferably include from 5% to 100 weight % $SiO_2$.

TABLE 1

| Range of Variables | Embodiment # 1 | Embodiment # 2 | Embodiment # 3 |
|---|---|---|---|
| Preform compositions | 5-100% $SiO_2$<br>0-95% SiC | 5-100% $SiO_2$<br>0-95% SiC | 5-95% $SiO_2$<br>0-90% SiC<br>5-95% preferred oxides |
| Al Bath - compositions | 2-95% Si with no SiC<br>or<br>25-95% Si with SiC<br>Balance Al (5-98%) | 0-90% Si with no SiC<br>or<br>18-90% Si with SiC<br>+5-95% preferred elements, added during bath preparation<br>Balance Al (5-95%) | 0-90% Si with no SiC<br>or<br>18-90% Si with SiC<br>+5-95% preferred elements, added by secondary reactions of preferred oxides<br>Balance Al (5-95%) |
| Al Bath - temperatures | 900-1250° C. (Si ≤ 60%)<br>or<br>1250-1650° C. (Si > 60%) | 900-1250° C. | 900-1250° C. |
| Final part compositions | $Al_2O_3$-Al-Si<br>$Al_2O_3$-Al-Si-SiC | $Al_2O_3$-Al-intermetallics<br>$Al_2O_3$-Al-intermetallics-Si<br>$Al_2O_3$-Al-intermetallics-Si-SiC | $Al_2O_3$-Al-intermetallics<br>$Al_2O_3$-Al-intennetallics-Si<br>$Al_2O_3$-Al-intermetallics-Si-SiC |

As such, an invention has been disclosed in terms of preferred embodiments thereof which fulfill each and every one of the objects of the invention as set forth hereinabove, and provides new and useful ceramic-metallic composites with improved properties and their methods of manufacture of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

The invention claimed is:

1. In a process for making a ceramic-metallic composite employing a displacement reaction in a molten metal bath, wherein the ceramic-metallic composite has the general formula $Al_2O_3$—SiC—Al, the improvement comprising conducting a process in which a ceramic-metallic composite including $Al_2O_3$—SiC—Al is formed with reduced concentration of free aluminum to enhance high temperature strength, including the steps of:
   a) providing a preform initially composed of from 5% to 60% by weight silicon dioxide ($SiO_2$) and 40% to 95% by weight Silicon Carbide (SiC);
   b) providing a molten metal bath composed of molten aluminum and 32% to 60% by weight of at least one additional molten substance, said at least one additional molten substance being within said bath either initially or via a subsequent displacement reaction of an oxide incorporated into said preform;
   c) immersing said preform in said bath for a sufficient time period to complete said displacement reaction between said preform and said bath;
   d) removing said preform from said bath;
   e) said preform when removed from said bath comprising a ceramic-metallic composite finished product consisting of $Al_2O_3$ as well as Silicon Carbide (SiC), free aluminum and a fourth substance, concentration of free aluminum in said finished product being reduced as compared to concentration of aluminum had said bath not included said additional molten substance, whereby said finished product exhibits enhanced high temperature strength as compared to high temperature strength of a finished product comprising $Al_2O_3$—SiC—Al but devoid of said fourth substance.

2. The process of claim 1, wherein said bath is maintained at a temperature of at least 900° C.

3. The process of claim 1, wherein said additional molten substance comprises silicon.

4. The process of claim 3, wherein said bath comprises 50% by weight silicon.

5. The process of claim 3, wherein said finished product comprises $Al_2O_3$—SiC—Al—Si.

6. The process of claim 1, wherein said preform comprises 36% by weight $SiO_2$ and 64% by weight silicon carbide (SiC).

7. The process of claim 6, wherein said finished product comprises $Al_2O_3$—SiC—Al—Si.

8. The process of claim 1, wherein said preform comprises a rod or bar.

9. In a process for making a ceramic-metallic composite employing a displacement reaction in a molten metal bath, wherein the ceramic-metallic composite has the general formula $Al_2O_3$—SiC—Al, the improvement comprising conducting a process in which a ceramic-metallic composite including $Al_2O_3$—SiC—Al is formed with reduced concentration of free aluminum to enhance high temperature strength, including the steps of:

a) providing a preform initially composed of from 5% to 60% by weight silicon dioxide ($SiO_2$) and 40% to 95% by weight Silicon Carbide (SiC);

b) providing a molten metal bath composed of molten aluminum and 32% to 60% by weight of at least one additional molten substance, said at least one additional molten substance comprising at least one element forming an intermetallic compound with aluminum having a boiling point greater than 1,250° C. and being within said bath either initially or via a subsequent displacement reaction of an oxide incorporated into said preform;

c) immersing said preform in said bath for a sufficient time period to complete said displacement reaction between said preform and said bath;

d) removing said preform from said bath;

e) said preform when removed from said bath comprising a ceramic-metallic composite finished product consisting of $Al_2O_3$ as well as Silicon Carbide (SiC), free aluminum and a fourth substance, concentration of free aluminum in said finished product being reduced as compared to concentration of aluminum had said bath not included said additional molten substance, whereby said finished product exhibits enhanced high temperature strength as compared to high temperature strength of a finished product comprising $Al_2O_3$—SiC—Al but devoid of said fourth substance.

10. The process of claim 9, wherein said element is chosen from the group consisting of Antimony, Barium, Calcium, Cerium, Chromium, Cobalt, Copper, Erbium, Gadolinium, Holmium, Iron, Manganese, Molybdenum, Neodymium, Nickel, Platinum, Praseodymium, Silicon, Strontium, Tellurium, Thorium, Vanadium, Yttrium, and Zirconium.

11. The process of claim 9, wherein said element comprises multiple elements which create complex intermetallic compounds composed of at least two or more elements.

12. The process of claim 9, wherein said preform comprises a rod or bar.

13. The process of claim 9, wherein said at least one additional molten substance comprises about 26% by weight Si and about 7.5% by weight Fe.

* * * * *